(12) United States Patent
Irmatov et al.

(10) Patent No.: US 8,885,943 B2
(45) Date of Patent: Nov. 11, 2014

(54) FACE DETECTION METHOD AND APPARATUS

(75) Inventors: Anwar Adkhamovich Irmatov, Moscow (RU); Dmitry Yurievich Buryak, Moscow (RU); Dmitry Vladimirovich Cherdakov, Balakovo (RU); Dong Sung Lee, Seoul (KR)

(73) Assignee: S1 Corporation (KR)

( * ) Notice: Subject to any disclaimer, the term of this patent is extended or adjusted under 35 U.S.C. 154(b) by 15 days.

(21) Appl. No.: 13/576,484

(22) PCT Filed: Jan. 12, 2011

(86) PCT No.: PCT/KR2011/000220
§ 371 (c)(1),
(2), (4) Date: Aug. 1, 2012

(87) PCT Pub. No.: WO2011/096651
PCT Pub. Date: Aug. 11, 2011

(65) Prior Publication Data
US 2012/0294535 A1    Nov. 22, 2012

(30) Foreign Application Priority Data
Feb. 5, 2010    (RU) .................................. 2010103904

(51) Int. Cl.
*G06K 9/46* (2006.01)
*G06K 9/00* (2006.01)
*G06K 9/62* (2006.01)

(52) U.S. Cl.
CPC .............. *G06K 9/00288* (2013.01); *G06K 9/46* (2013.01); *G06K 9/6256* (2013.01); *G06K 2009/4666* (2013.01)
USPC ........... 382/195; 382/103; 382/118; 382/165; 382/224; 382/225; 382/284

(58) Field of Classification Search
CPC .......... G06K 9/00268; G06K 9/00221; G06K 9/00248; G06K 2009/4666; G06K 9/32; G06K 9/00302; G06K 9/6292; G06K 9/6203; G06T 2207/30201; G06T 2207/10016; G06T 7/0081; G06T 7/0083; G08G 1/167
USPC .......... 382/103, 118, 165, 168, 195, 224, 225, 382/284
See application file for complete search history.

(56) References Cited

U.S. PATENT DOCUMENTS 7,430,315 B2 *  9/2008  Yang et al. .................... 382/159
7,822,696 B2 * 10/2010  Zhang et al. .................... 706/20
(Continued)

FOREIGN PATENT DOCUMENTS

CN          101127076 A       2/2008

OTHER PUBLICATIONS

Wu, Bo et al., "Simultaneous Object Detection and Segmentation by Boosting Local Shape Feature based Classifier", in: 2007 IEEE conference on Computer Vision and Pattern Recognition, Minneapolis, USA, Jun. 2007.

(Continued)

*Primary Examiner* — Vu Le
*Assistant Examiner* — Aklilu Woldemariam
(74) *Attorney, Agent, or Firm* — Lerner, David, Littenberg, Krumholz & Mentlik, LLP

(57) ABSTRACT

Image fragments are formed in regions corresponding to circles searched from an input image. In a cascade of homogeneous classifiers, each classifier classifies input vectors corresponding to the image fragments into a face type and a non-face type. This procedure is performed on all images included in an image pyramid and the coordinates of a face detected based on the results of the procedures on all images.

11 Claims, 7 Drawing Sheets

(56) References Cited

U.S. PATENT DOCUMENTS

| | | | |
|---|---|---|---|
| 8,625,858 B2* | 1/2014 | Torii et al. | 382/118 |
| 2004/0264744 A1* | 12/2004 | Zhang et al. | 382/118 |
| 2005/0180627 A1* | 8/2005 | Yang et al. | 382/159 |
| 2007/0086660 A1* | 4/2007 | Ai et al. | 382/226 |
| 2007/0127786 A1* | 6/2007 | Hiraizumi et al. | 382/118 |
| 2009/0067730 A1* | 3/2009 | Schneiderman | 382/224 |
| 2009/0161912 A1* | 6/2009 | Yatom et al. | 382/103 |
| 2009/0252435 A1* | 10/2009 | Wen et al. | 382/284 |

OTHER PUBLICATIONS

International Search Report for Application No. PCT/KR2011/000220 dated Aug. 30, 2011.

* cited by examiner

FACE DETECTION METHOD AND APPARATUS

CROSS REFERENCE TO RELATED APPLICATIONS

The present application is a national phase entry under 35 U.S.C. §371 of International Application No. PCT/KR2011/000220, filed Jan. 12, 2011, published in Korean, which claims priority from Russian Patent Application No. 2010103904, filed Feb. 5, 2010, all of which are incorporated herein by reference.

TECHNICAL FIELD

The present invention relates to a digital image processing field, and more particularly, relates to a method and apparatus for detecting a face in a digital image.

BACKGROUND ART

Digital images are used in current multimedia devices. A function among basic functions of the multimedia device determines the existence and location of a face in a digital image. The function is needed in the case of sorting images stored in the device according to contents, processing an image region by a digital photographing and printing device, identifying and verifying in an access control and video surveillance system, interacting with a person with a computer system, and others.

In order to solve the object of detecting a task in an image, there are many techniques using a neural network, vector decomposition, a support vector machine (SVM), and others. Under the condition in which an object to be searched is not distinctly formalized, these approaches use a training stage (e.g. parameter tuning) that needs a large number of samples for the object. The training stage in each approach performs a task for determining an object grade in an image, which requires a large amount of computation and a high cost arises therefrom. Computational complexity significantly increases when a location, size, and direction of a face in an image are determined in the training stage.

There are face detection systems described in U.S. Pat. Nos. 6,661,907 and 6,816,611. The systems use color information of images. This peculiarity significantly restricts areas in which the method is applied to because of requiring a color image capturing device.

In addition, there is a two-stage face detection system described in U.S. Pat. No. 6,940,545. The system is based on a probabilistic model estimating color information related to the head of a person, for example, hair and skin, in the first stage, and uses a Bayesian classifier in the second stage. The Bayesian classifier processes a hypothesis and performs a final decision about the existence and location of a face in an image. This system may be embedded in a digital camera for precise estimation for image capturing parameters when a face exists in the area to be photographed. However, this system induces quite weak requirements on algorithm efficiency and processing speed, and thereby it is apparently inefficient in many other face detection tasks.

Another system using a two-stage face detection algorithm is disclosed in U.S. Pat. No. 6,463,163. In the system, a two-element algorithm including liner and nonlinear filters is performed in the first stage. Correlation with a core of the linear filter is first calculated and then the resulted correlation map is processed in order to extract local extremes. The first stage is completed by comparing intensity characteristics of regions related to the extremes with values obtained from a model. Through the first stage, a set of regions where a face could be located is obtained. At the second stage, the found regions are processed by a multilayer feed-forward neural network, and thereby the list of faces found in images is obtained. However, the algorithm has drawbacks in that the stability of face orientation is low. Further, the computational speed of the multilayer neural networks is quite low, and therefore it could be insufficient for running the algorithm in real-time applications These drawbacks were partly solved in U.S. Pat. No. 7,099,510. It proposes an algorithm for effectively searching a location of a face region with computation considering shifting and scale adjusting. The algorithm is based on a cascade of simple classification procedures. The construction and combinations of classifiers according to the cascade result in high accuracy of tasks and low running time. However, the face detection effectiveness of all the classifiers is quite low.

As stated above, in the prior systems, high processing speed in detecting a face is needed. Further, due to errors occurred in detecting a face occur, the factors (e.g. an obstacle such as diversity of faces, spectacles, mustache, or a hat) having a big effect on the performance of the system are not processed. In addition, structural complexity of external environments, randomness of illumination, and others result in many errors such as detecting a non-existent face in practice. These errors are fatal to the performance of a biometric identification system.

DISCLOSURE

Technical Problem

The present invention has been made in an effort to provide a method and apparatus for consistently detecting a face from an image at a faster speed under various illumination conditions.

In addition, the present invention has been made in an effort to provide a method and apparatus for reducing errors when incorrectly detecting a face from an image under complex environments having various structures.

Technical Solution

An exemplary embodiment of the present invention provides a method for detecting a face. The method includes: detecting a circle from an input image by using a Hough transform; forming image fragments of the same size in a region of the detected circle; generating input vectors for each of the image fragments by using each classifier of a cascade that includes homogeneous classifiers; and when an input vector generated by the image fragments is classified into a face type by the classifier of the cascade, determining that a face is detected from the input image.

Another exemplary embodiment of the present invention provides an apparatus for detecting a face. The apparatus includes: a cascade classifier that is formed in a type of a cascade, includes homogeneous classifiers, and classifies input vectors into a face type and a non-face type based on input images; a circle detector that detects a circle from the input image by using a Hough transform; and an image analyzer that forms image fragments of the same size within a region of the detected circle, wherein the image analyzer generates input vectors for the image fragments by using the classifiers of the cascade classifier, and determines that a face is detected from the input image when the input vector is classified into the face type by all the classifiers.

Advantageous Effects

According to the exemplary embodiments of the present invention, it is possible to correctly detect a face from an image at faster speed. Under complex environments having various structures or in which illumination changes, the number of errors of incorrectly detecting a face from an image can be reduced.

MODE FOR INVENTION

Figure 1:
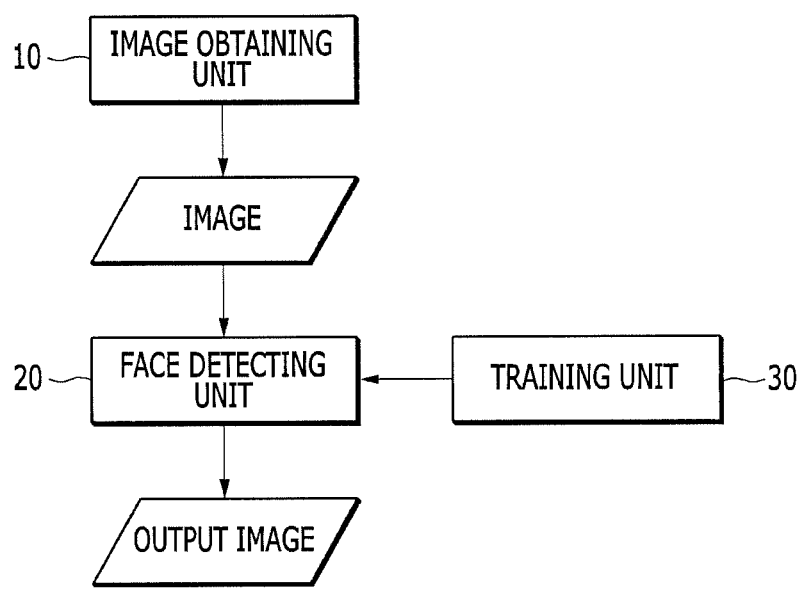
FIG. 1 shows a configuration diagram of an apparatus for detecting a face according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Through the specification, in addition, unless explicitly described to the contrary, the word "comprise" and variations such as "comprises" or "comprising" will be understood to imply the inclusion of stated elements but not the exclusion of any other elements.

Next, referring to the drawings, a method and apparatus for detecting a face according to an exemplary embodiment of the present invention will be described.

In an exemplary embodiment of the present invention, homogeneous classifiers of a cascade type are used for detecting a face from an image. Each classifier classifies input vectors into a face type and a non-face type, and has high precision over the previous classifier of the previous stage.

Particularly, in an exemplary embodiment of the present invention, circles having a predetermined radius are searched from an input image by using a Hough transform, the regions corresponding to the searched circles are divided into fragments with the same size, and a set of the fragments is formed. The homogeneous classifiers of the cascade type are applied to each fragment included in the set so that each classifier determines whether a corresponding fragment includes a face.

FIG. 1 shows a configuration diagram of an apparatus for detecting a face according to an exemplary embodiment of the present invention.

As shown in FIG. 1, the apparatus for detecting a face according to an exemplary embodiment of the present invention includes an image obtaining unit 10 for obtaining an image from an object, a face detecting unit 20 for detecting a face from the obtained image, and a training unit 30 for constructing classifiers for face detecting.

The image obtaining unit 10 obtains an image as a source for detecting a face and may include a device such as a digital camera, an image database, or a device for selecting an image from an image sequence.

The face detecting unit 20 detects a face from the image provided from the image obtaining unit 10. The image in which the face detected by the face detecting unit 20 is marked is output and the coordinates of the face are output.

The training unit 30 is used in the training stage according to an exemplary embodiment of the present invention. The training unit 30 performs a training procedure to train samples including face images and non-face images, and constructs classifiers running the training procedure. The training procedure is performed once before starting use of classifiers. The results of the training procedure are provided to the face detecting unit 20, and the face detecting unit 20 detects a face from an input image with an obtained classifier.

Figure 2:
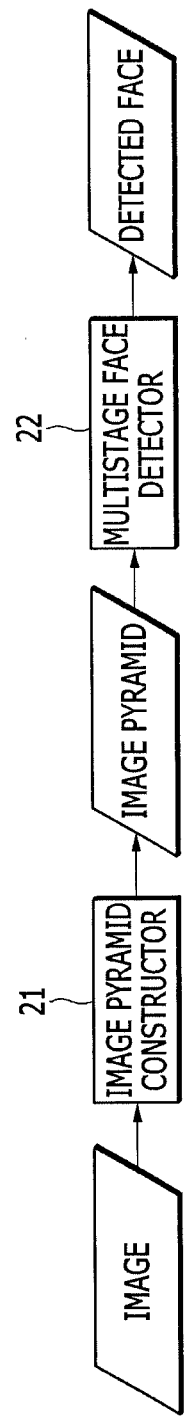
FIG. 2 shows a configuration of a face detecting unit according to an exemplary embodiment of the present invention.

FIG. 2 shows a configuration diagram of the face detecting unit according to an exemplary embodiment of the present invention.

As shown in FIG. 2, the face detecting unit 20 according to an exemplary embodiment of the present invention includes an image pyramid constructor 21 and a multistage face detector 22.

The image pyramid constructor 21 is provided with an image, and the image may be provided from a video camera, am image database, a video sequence, or other digital image sources. The image pyramid constructor 21 forms a collection of images in which each image is a copy of a source image scaled down by a predetermined ratio. That is, an image provided from the image obtaining unit 10 becomes a source image, and then the source image is scaled down with the predetermined ratio. Each image of the collection is a copy of the source image. Here, the predetermined ratio for scale adjustment may be different by images included in the collection. The collection of these images may be referred to as "an image pyramid", and the image pyramid is provided to the multistage face detector 22.

The multistage face detector 22 detects a face from each image of the image pyramid and generates results of images in which the detected face is indicated. Also, the multistage face detector 22 generates a face coordinate set of coordinates for the detected face.

The face detecting unit 20 may realized to include a digital processor, a source image storage, and a spare buffer, and the image pyramid constructor 21 and the multistage face detector 22 may be embodied and operated in a digital processor.

Figure 3:
FIG. 3 shows a configuration of a multilevel face detector according to an exemplary embodiment of the present invention.

FIG. 3 shows a configuration of the multilevel face detector according to an exemplary embodiment of the present invention.

As shown in FIG. 3, the multistage face detector 22 according to an exemplary embodiment of the present invention includes a face detector 221 and a face integrator 222. Basic data processed in the face detector 221 is the image pyramid.

The face detector 221 detects a face from each image included in the image pyramid, and provides the face coordinates corresponding to the detected face to the face integrator 222.

The face integrator 222 integrates the face coordinates to be inputted and finally calculates the coordinates of the detected face. The face integrator 222 performs clusterization of the coordinates of the detected face and analyzes the parameter (e.g. a size, confidence level) of each cluster. The face integrator 222 determines which cluster relates to a face in an input image based on a predetermined threshold value. Here, a confidence level is calculated based on a sum of confidence values of every cluster element. The confidence values of every cluster element are included in an output value as the result of face detection processing.

Figure 4:
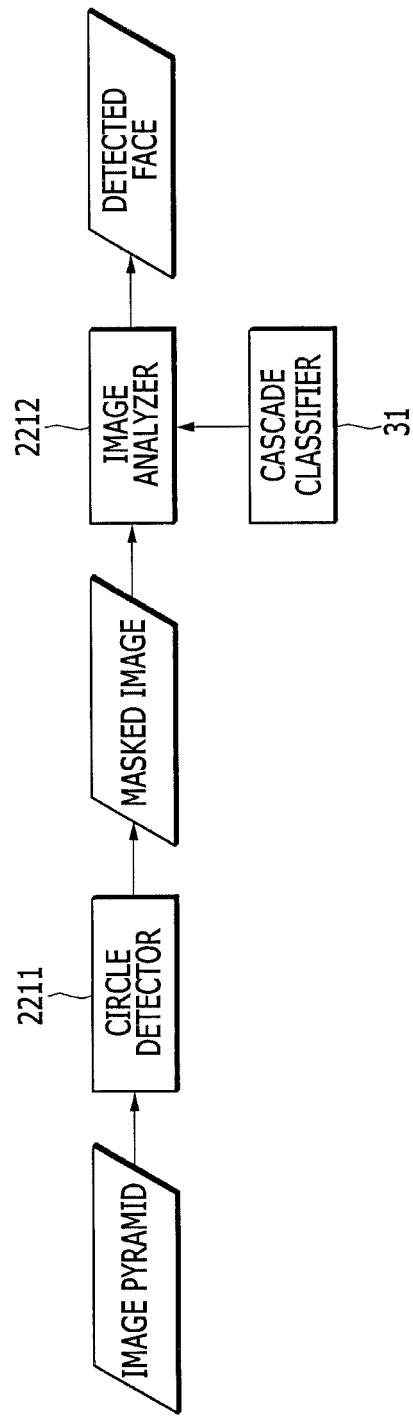
FIG. 4 shows a configuration of a face detector according to an exemplary embodiment of the present invention.

FIG. 4 shows a configuration of a face detector according to an exemplary embodiment of the present invention.

As shown in FIG. 4, the face detector 221 according to an exemplary embodiment of the present invention includes a circle detector 2211 and an image analyzer 2212, and operates in connection with a cascade classifier 31 of the training unit 30. The image pyramid is input to the circle detector 221, and the circle detector 221 detects all areas having a radius in an image, that is, circles, by using a Hough circle transform for circle detection.

The circle detector 221 constructs a map based on the results of the circle detection and indicates points corresponding to the centers of all the circles in the map. Then, the circle detector 221 forms a masked image by using the input image and the map, that is, a circle map, and provides the masked image to the image analyzer 2212.

The image analyzer 2212 generates a set of fragments by scanning the masked image. The set of fragments including image fragments is processed by the cascade classifier in the following stage.

Figure 5:
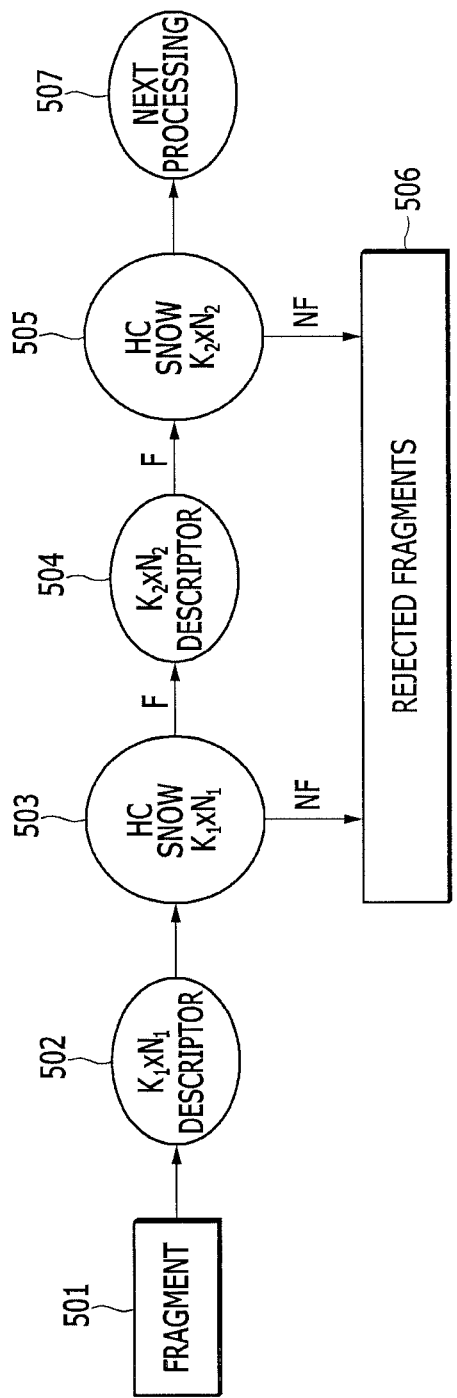
FIG. 5 shows an operation of a classifier according to an exemplary embodiment of the present invention.

FIG. 5 shows an operation of a classifier according to an exemplary embodiment of the present invention.

The classifier 31 according to an exemplary embodiment of the present is a cascade classifier. The cascade classifier 31 includes a plurality of classifiers, and particularly includes homogeneous classifiers. The image analyzer 2212 of the image detector 221 calls for all the classifiers to determine the type of an image fragment as one of a face type and a non-face type.

Each classifier of the cascade classifier 31 operates with descriptor vectors which are constructed by image fragments.

In the first stage of cascade, descriptor vectors for fragments to be input are formed and the descriptor vectors have a short length (501, 502). The first classifier processes the descriptor vectors (S503).

When the process on the descriptor vectors having a short length has been completed, the fragments which are classified into a non-face type by the first classifier are eliminated from the set of fragments. The first classification process performed by the first classifier uses a vector of a relatively short length, and thereby the speed of the first classification process is fast. The fragment elimination process on negative samples (image fragments classified into a non-face type) is indicated as "NF (non-face)" in FIG. 5. Image fragments regarded as negative samples are included in the set of rejected samples (506).

When a classifier (the first classifier) classifies an image fragment into a face type, the image fragment is provided to the next classifier of the cascade. This process corresponds to the arrow indicated as "F" (face) in FIG. 5.

When four stages of the cascade classifier are completed (504, 505), the image fragments not included in the set of the fragments that are processed as a rejected sample and are rejected by any classifier of the cascade classifier are passed to the stage for an additional process such as processing or output processing by an additional classifier in the cascade classifier, e.g., highlighting the instances of faces in an output image (507).

The later classifiers of the cascade classifier perform elimination for the negative samples classified as the non-face type, but require additional computation as compared with the first classifier. All the classifiers after the first classifier in the cascade classifier operate with vectors having progressively larger lengths, and thereby the processing speed is slower than that of the first stage performed by the first classifier.

A set of image fragments generally formed by an image processor includes a large number of non-face-type fragments and few face-type fragments. Most of the non-face-type fragments are eliminated in the first stage in the cascade classifier, and only a small number of fragments are processed through all the following stages. As above, a large number of non-face-type fragments are eliminated in the first stage and only a small number of fragments are processed in computationally expensive stages. Therefore, this scheme of processing provides high computational speed for the whole cascade.

The data input to the cascade classifier are vectors calculated by using a processed fragment. First, a fragment is scaled with a ratio corresponding to the position of a classifier in the cascade classifier, and then a local binary pattern (LBP) descriptor is calculated. The first stages of the cascade use a large scaling factor or scaling ratio and use descriptor vectors of a smaller length, which provides high computational speed of classifiers in these stages.

Figure 6:
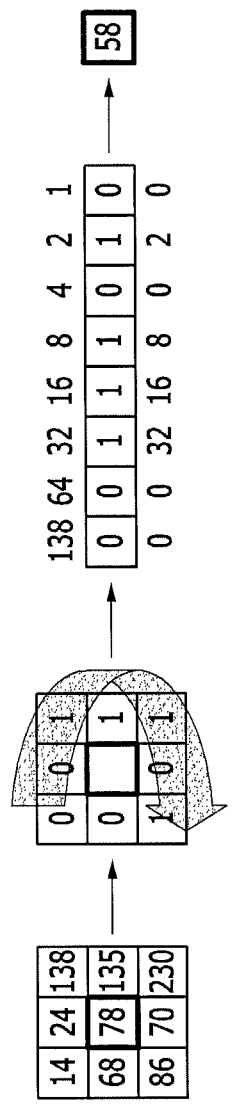
FIG. 6 shows a local binary pattern (LBP) procedure according to an exemplary embodiment of the present invention.

A LBP construction procedure includes pair-wise intensity comparison between a pixel and 8 neighboring pixels. The results of the comparison are coded with a binary 8-element vector, and a value of each element of the vector is "0" or "1" based on each of the results. These binary vectors have a binary notation of a decimal number from the range [0, 255]. That is, the results of the LBP are a decimal number calculated on a related binary vector. Each binary vector has an 8-bit binary notation and corresponds to one among the decimal numbers from 0 to 255. FIG. 6 shows this LBP procedure.

Referring to FIG. 6, intensity comparison between a predetermined pixel having an instance value of "78" and 8 neighboring pixels is performed.

When an instance value of a neighboring pixel is smaller than that of the predetermine pixel, "0" is substituted for the instance value of the neighboring pixel. When an instance value of a neighboring pixel is larger than that of the predetermine pixel, "1" is substituted for the instance value of the neighboring pixel.

Through the above process, the substituted values of the pixels are arranged based on the values of the upper left pixel among the pixels (00111010), and the resulting value "58" of the LBP operation is calculated by the decimal arithmetic operation on the arranged pixel values.

The LBP operation is applied to all the pixels of an image fragment, and the descriptor vector is a vector of all LBP resulting values. The descriptor vector is a matrix of an H×W size, and elements of the matrix are integers from 0 to 255.

Each classifier included in the cascade may be an artificial neural network (NN) with SNOW architecture. A layer of the artificial neural network has a feed-forward structure, and is fully connected to the network. The size of input layer is based on the length of the descriptor vector and is calculated according to the following Equation 1.

$$N = 256 \times W \times H \tag{Equation 1}$$

Here, W represents the width of the descriptor vector and H represents the height of the descriptor vector.

The output layer consists of two neurons. One of them codes the face types and the other codes the non-face types.

The input vector input to the neural network is binary, and the number of elements corresponding to "1" is equal to W×H. The size of the input vector is large, but most of the elements of the input vector are "0". Thus, when calculating the output of the neural network, the number W×H of the elements of the input vector are used. Accordingly, it is possible to improve the processing speed of the neural network.

An input vector is constructed by calculating positions of unit elements and setting all the elements except for the unit element as "0", and the positions of the unit elements are calculated as follows.

$$Ind = 256 \times (y \times W + x) + D(x, y) \quad \text{(Equation 2)}$$

Here, x and y represent coordinates of an element of a descriptor, and W represents the width of the descriptor.

An activation function $f(u)$ is a sigmoid function, and may be shown in the following.

$$f(u) = \frac{1}{1 + e^{-u}} \quad \text{(Equation 3)}$$

The decision on the input vector classification is made based on the results of comparison of the output neuron values of the NN.

In an exemplary embodiment of the present invention, a procedure for determining a type of an input vector is performed as follows.

First, linear combination of the input vector and neuron weight values is performed.

$$u_i = \sum_{j=1}^{N} w_{ij} z_j, \quad i = 1, 2 \quad \text{(Equation 4)}$$

In Equation 4, w represents a neuron weight value, z represents an input vector, and i and j represent an index.

Next, a non-linear function will be calculated.

$$g(u_1, u_2) = \frac{1}{1 + e^{-(u_1 - u_2)}} \quad \text{(Equation 5)}$$

Here, $g(u_1, u_2)$ represents a value of the non-linear function.

When a value of the non-linear function is larger than that of a threshold value $thr_1$, the corresponding input vector is determined as a face type. When a value of the non-linear function is not larger than that of the threshold value $thr_1$, the corresponding input vector is determined as a non-face type. Here, the threshold value may be calculated as follows.

$$thr_1 = -\log\left(\frac{1}{thr} - 1\right) \quad \text{(Equation 6)}$$

The comparison of the non-linear function value for each input vector and the threshold value may be replaced with the calculation of an expression $u_1 - u_2$ and the comparison of its value and the threshold value $thr_1$.

The difference $(u_1 - u_2)$ between two linear combinations may be calculated as follows.

$$u_1 - u_2 = \sum_{j=1}^{N} (w_{1j} - w_{2j}) z_j \quad \text{(Equation 7)}$$

The neural network may be replaced with new one that has the same input layer, but only one neuron in an output layer. Weight values of the one neuron are equal to differences between respective weights of neurons of the previous neural network, and the new neural network requires half the computations.

The cascade according to an exemplary embodiment of the present invention may include four neural networks that have the above-described structure, but is not restricted to thereto.

A fragment input to a classifier includes 24×24 pixels.

At the first stage, a neural network processing descriptors of 3×3 pixels operates. Next, the descriptor of 4×3 pixels operates, then the descriptor of 6×6 pixels, and finally the descriptor of 12×12 pixels operates.

The structure of the neural network according to an exemplary embodiment of the present invention may be selected based on the experimental results. In order to obtain the experimental results, a predetermined training algorithm, which may be one of well-known algorithm, is used for calculating weight values.

A training stage is performed in an exemplary embodiment of the present invention. The training stage may be performed by the training unit 30, and includes the two sets of training and test. Each set includes face-type of fragments and non-face-type of fragments, neuron weight values are calculated in the training set, and the efficiency of the NN is verified on samples from the test set.

The training set includes the following steps.

1) Initial training procedure
2) One or a plurality of steps of a bootstrap procedure First, the NN, operating at the first stage, is trained.

The NN is launched on training samples, and all samples rejected by the NN are eliminated from the training samples. The same procedure is performed on the test set.

The updated sets are used for training the NN operating at the second stage. Similar to the first stage, the NN operating at the second stage processes the samples of the training set and the test set, and samples classified into a non-face type are removed from the samples. These procedures are repeated for all the NNs included in the cascade.

A training process of a single NN is controlled by using the test set. In an exemplary embodiment of the present invention, the number of non-face type samples, on which a NN fails, is fixed. After every training procedure, the number of samples that are mistakenly classified into a face type while an NN performs a training process is counted. The training procedure may be continued until the number of samples decreases.

As stated above, in the exemplary embodiment of the present invention, until the number of samples that are classified into a face type by errors reaches the minimum value, the training procedure may be continued. Then, an NN satisfying the minimum values is determined.

The bootstrap procedure is performed as follows.

The cascade of classifiers is formed on the images that include no face. All image fragments on which the cascade makes mistakes are added to the training set. That is, the image fragments mistakenly determined as a non-face type by the cascade are added to the training set. All the NNs of the cascade are retrained by using the updated training set.

Next, a method for detecting a face according to an exemplary embodiment of the present invention will be described based on the above.

Figure 7:
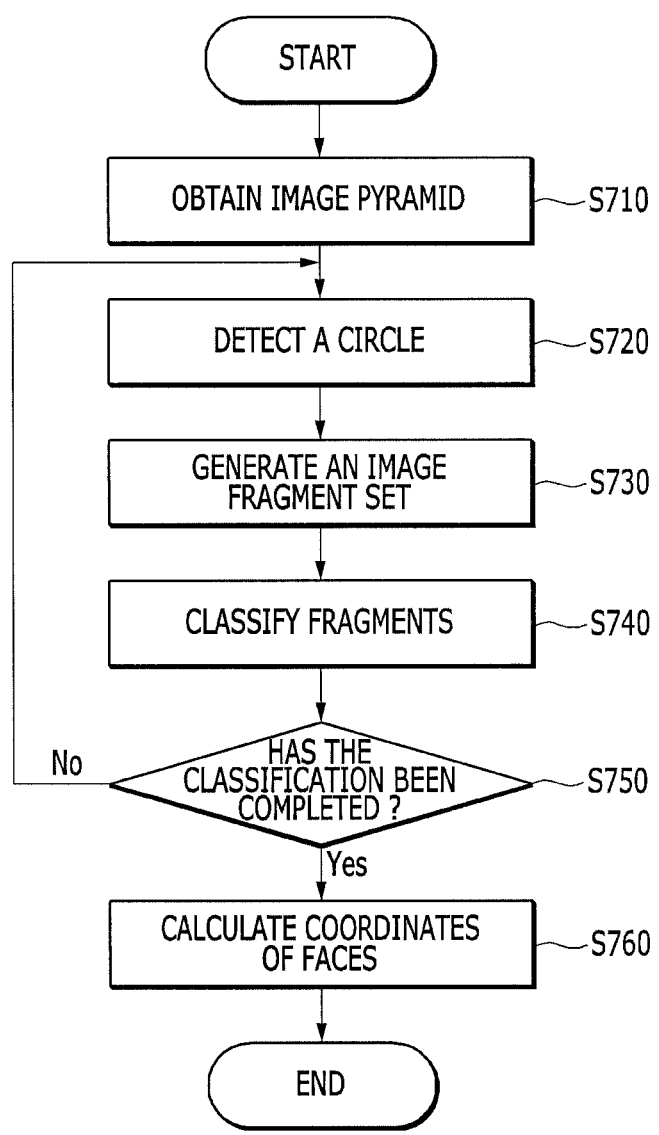
FIG. 7 shows a flowchart of a method for detecting a face according to an exemplary embodiment of the present invention.

FIG. 7 shows a flowchart of a method for detecting a face according to an exemplary embodiment of the present invention.

Image pyramids that are scaled at the first stage are obtained (S710), and a face is detected from each image of the image pyramids through the following steps.

Circles corresponding to the regions of a radius are detected from the scaled images by using a Hough transform (S720). By scanning the regions corresponding to the circles, a set of image fragments for classification is formed (S730). The set of image fragments is input to the cascade classifier 31 shown in FIG. 5.

The cascade classifier 31 is a cascade of neural networks, and includes neural networks (referred to as "a first neural network") that have high computational speed and operate at the first stage). These first neural networks use vectors of a short length and perform rough processing on an input image. Most of image fragments that do not represent a face are removed while image fragments representing a face are preserved for further processing.

In the next stage of the cascade, more complicated and slower neural networks (referred to as "a second neural network") operate. These second neural networks process high dimensional vectors, and more precisely distinguish image fragments including a face and image fragments not including a face. Through the first and second neural networks, image fragments are classified into a face type or a non-face type (S740).

As stated above, the face detector 221 performs classification processing on all images of the image pyramid through the cascade of the neural networks and provides the results of the classification processing to the face integrator 222 (S750).

Then, the face integrator 222 determines whether the classification processing on all image of the image pyramid has been completed (S750). When the classification processing has been completed, the face integrator 222 calculates coordinates of faces detected from the images based on the results of the classification processing by using a clusterization and heuristics algorithm (S760). After this, the method for detecting a face finishes.

According to the exemplary embodiments of the present invention, stages for performing algorithms for face detection are constructed in a type of a cascade, and process both image information of the same type and image information of different types so that high efficiency of the algorithm is provided. The cascade structure has a characteristic of flexibility, and the number of stages included in the cascade is variable. Through the stages of the cascade, it is possible to detect a face with high accuracy and high speed.

The method and apparatus for detecting a face according to the exemplary embodiments of the present invention may be applied to a biometric system for identifying a face of a person from an image, and may further be embodied by being applied to special equipment such as a signal processor.

An exemplary embodiment of the present invention may not only be embodied through the above-described apparatus and/or method, but may also be embodied through a program that executes a function corresponding to a configuration of an exemplary embodiment of the present invention and through a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for detecting a face, comprising:
   detecting a circle having a predetermined radius from an input image by using a Hough transform;
   dividing a region of the detected circle to form image fragments of the same size;
   generating input vectors for each of the image fragments by using each classifier of a cascade that includes homogeneous classifiers, wherein input vectors are calculated based on local binary descriptors and the local binary descriptors include a pairwise intensity comparison between a pixel and eight or fewer neighboring pixels;
   when an input vector generated for each of the image fragments is classified into a non-face type, determining that no face is detected in the input image; and
   when an input vector generated for each of the image fragments is classified into a face type by the classifier of the cascade, determining that a face is detected from the input image.

2. The method of claim 1, the detecting of a circle further includes forming an image pyramid including images that are copies of images scaled down by a predetermined ratio.

3. The method of claim 2, wherein the classifying of input vectors further includes
   training the homogeneous classifiers based on a database including a training set.

4. The method of claim 1, wherein the classifier is provided with an input vector of a larger size in comparison with a previous classifier, and
   the input vector is formed for an image fragment corresponding to an image scaled down by a predetermined ratio, and the predetermined ratio gradationally is reduced.

5. The method of claim 1, wherein the classifier of the cascade operates based on an artificial neural network of a spare network of winnows architecture (SNOW structure).

6. An apparatus for detecting a face, comprising:
   a cascade classifier that is formed in a type of a cascade, includes homogeneous classifiers, and classifies input vectors into a face type and a non-face type based on input images;
   a circle detector that detects a circle having a predetermined radius from the input image by using a Hough transform; and
   an image analyzer that forms image fragments of the same size within a region of the detected circle, wherein the image analyzer generates input vectors for the image fragments by using the classifiers of the cascade classifier, wherein input vectors are calculated based on local binary descriptors and the local binary descriptors include a pairwise intensity comparison between a pixel and eight or fewer neighboring pixels, determines that no face is detected from the input image when the input vector is classified into the no-face type by the classifiers, and determines that a face is detected from the input image when the input vector is classified into the face type by all the classifiers.

7. The apparatus of claim 6, further comprising
   an image pyramid constructor for including images that are copies of images scaled by a predetermined ratio.

8. The apparatus of claim 6, further comprising
a training unit for training the homogeneous classifiers based on a database including a training set.

9. The apparatus of claim 6, wherein the classifier is provided with an input vector of a larger size in comparison with a previous classifier, and
the input vector is formed for an image fragment corresponding to an image scaled down by a predetermined ratio, and the predetermined ratio gradationally is reduced.

10. The apparatus of claim 6, wherein the classifier of the cascade operates based on an artificial neural network of a spare network of winnows architecture (SNOW structure).

11. The apparatus of claim 6, further comprising a face integrator that calculates coordinates of the face detected by the image analyzer.

* * * * *